May 20, 1969  G. E. LUSK  3,445,580

POWER CABLE TERMINATION WITH IMPROVED ENTRANCE SYSTEM

Filed Oct. 13, 1967  Sheet 1 of 3

Inventor
George E. Lusk.

By Hume Clement Hume & Lee
Att'ys.

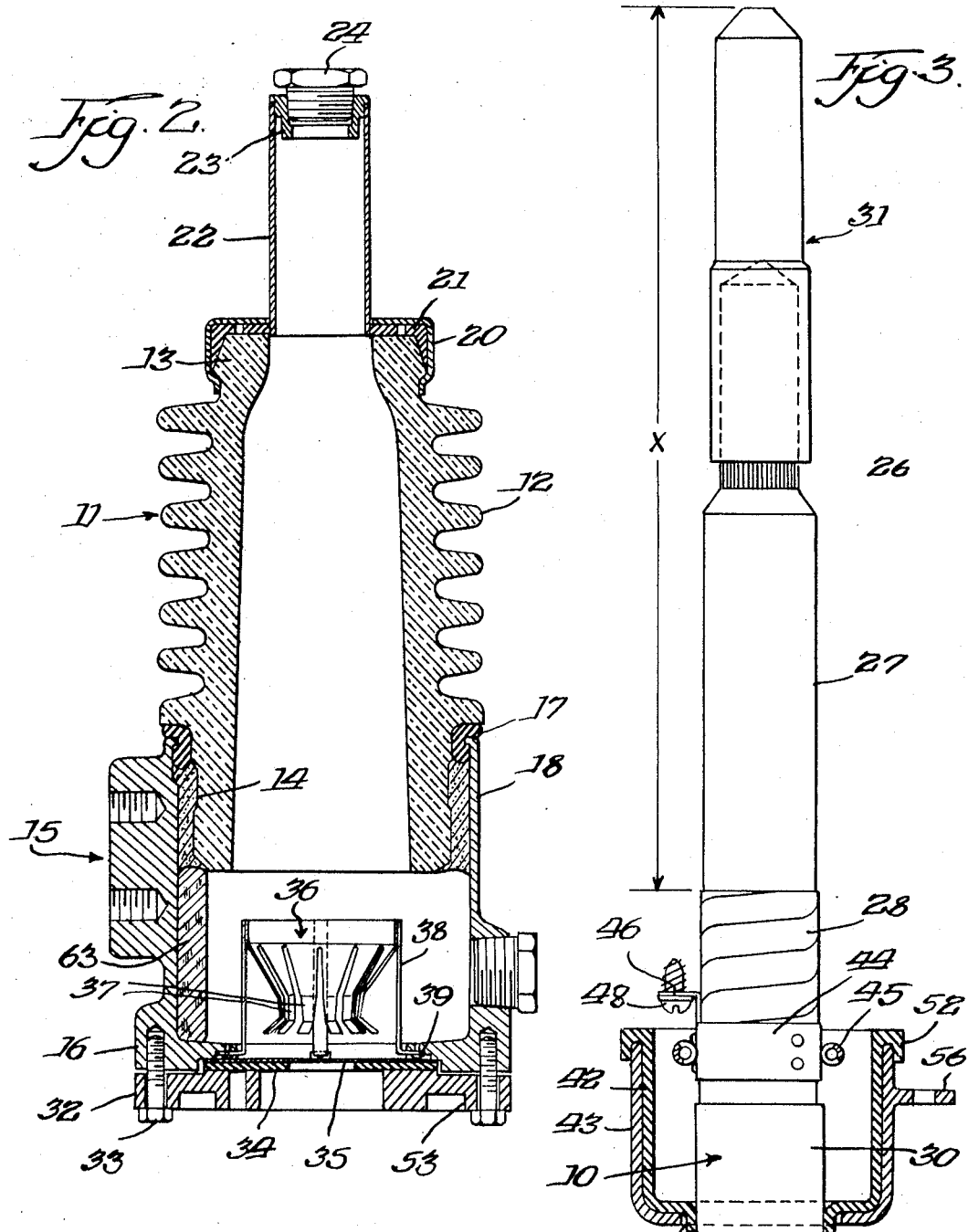

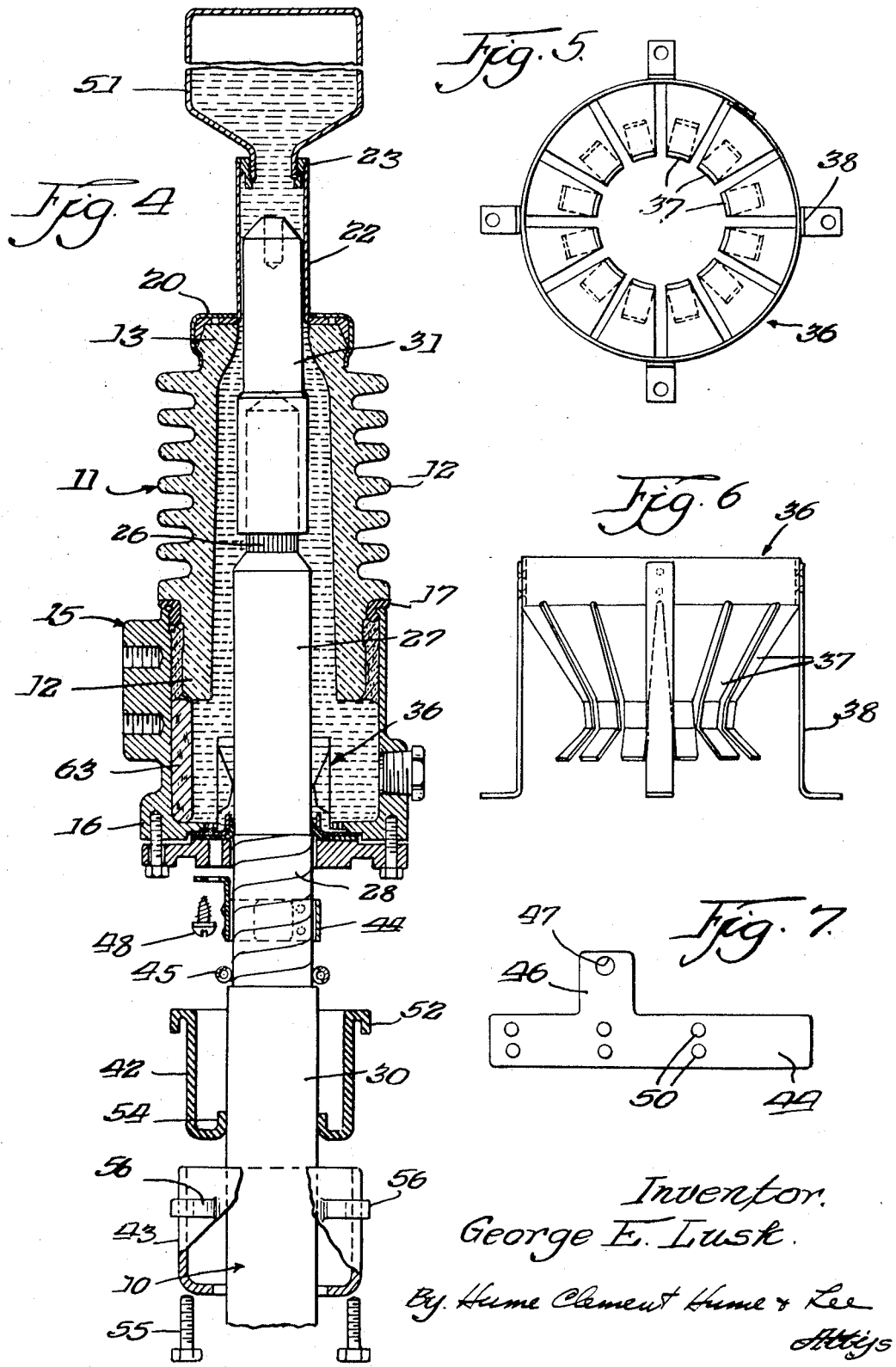

United States Patent Office 3,445,580
Patented May 20, 1969

3,445,580
POWER CABLE TERMINATION WITH
IMPROVED ENTRANCE SYSTEM
George E. Lusk, Downers Grove, Ill., assignor to G & W
Electric Specialty Company, Blue Island, Ill., a corporation of Illinois
Filed Oct. 13, 1967, Ser. No. 675,187
Int. Cl. H02g 15/04, 15/08
U.S. Cl. 174—12                6 Claims

ABSTRACT OF THE DISCLOSURE

The present terminator is factory assembled to include a stress control device and the terminator is filled with a dielectric compound and then sealed to prevent contamination. After the cable end is prepared, the terminator can either be slipped onto the cable or bolted to mounting structure and the cable pushed into the terminator. The excess dielectric displaced by the cable is collected in a separate container.

---

The invention relates to a cable termination system especially designed for polyethylene insulated cables and for other plastic, elastomeric, and taped insulated, shielded cables of various construction and has for its principal objective to provide a factory assembled, pre-filled terminator having improved entrance sealing structure.

In the termination of high voltage shielded power cables it has been known to build up a stress relief cone to increase the effective diameter of the cable at the point where the cable shield is terminated. This larger diameter at the point of termination reduces the electrical stress concentration and thus reduces the formation of corona and the likelihood of arcing or tracking. More recently as disclosed in the Lusk Patents 3,322,883 and 3,343,499, the stress relief cone has been replaced by a girdle shield in the form of a closed annular member located within the pothead and in contact with the cable insulation and cable overshield. An advantage in using the girdle shield, which is made possible by a special filling compound within the pothead, is the elimination of the construction time for the usual stress cone device and the filling of the pothead and also the elimination of the dependency on the installation man in the field in building up the stress cone to the proper dimensions and shape.

The cable terminator of the invention satisfactorily meets the installation problem since a stress relief shield of conductive spring metal such as beryllium copper is employed. The said girdle shield is stamped and formed to the proper contour and the shield is then factory installed within the terminator.

The factory assembled device is then filled with a special insulating compound, that is, one having a dielectric constant or specific inductive capacitance approximate to that of the dielectric materials used in the cable insulation. This provides a dielectrically compatible system of isotropic nature.

A further object of an invention is to provide a cable termination system which embodies an improved entrance sealing structure in the form of an elastomeric boot and enclosing metal housing. The improved entrance sealing structure provides a good current carrying connection to the cable overshield without applying excessive pressure to the cable insulation and without the need for soldering or the use of lugs or clamps. Also, the cable overshield and the termination grounding system are protected from the outside atmospheric environment.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 2 is a vertical section view of the termination device of the invention showing the same in factory assembled form and ready for installation;

FIGURE 3 is an elevational view, the parts being shown in section, and which illustrates one of the initial steps in assembling the present terminator on the prepared end of a power cable;

FIGURE 4 is another view with parts being shown in section illustrating one of the final steps in assembling the present terminator on the prepared end of a power cable;

FIGURE 5 is a top plan view of the girdle shield which is factory assembled in the present terminator;

FIGURE 6 is an elevational view of the gridle shield; and

FIGURE 7 is a view showing the formation of the metal grounding strap.

Figure 1:
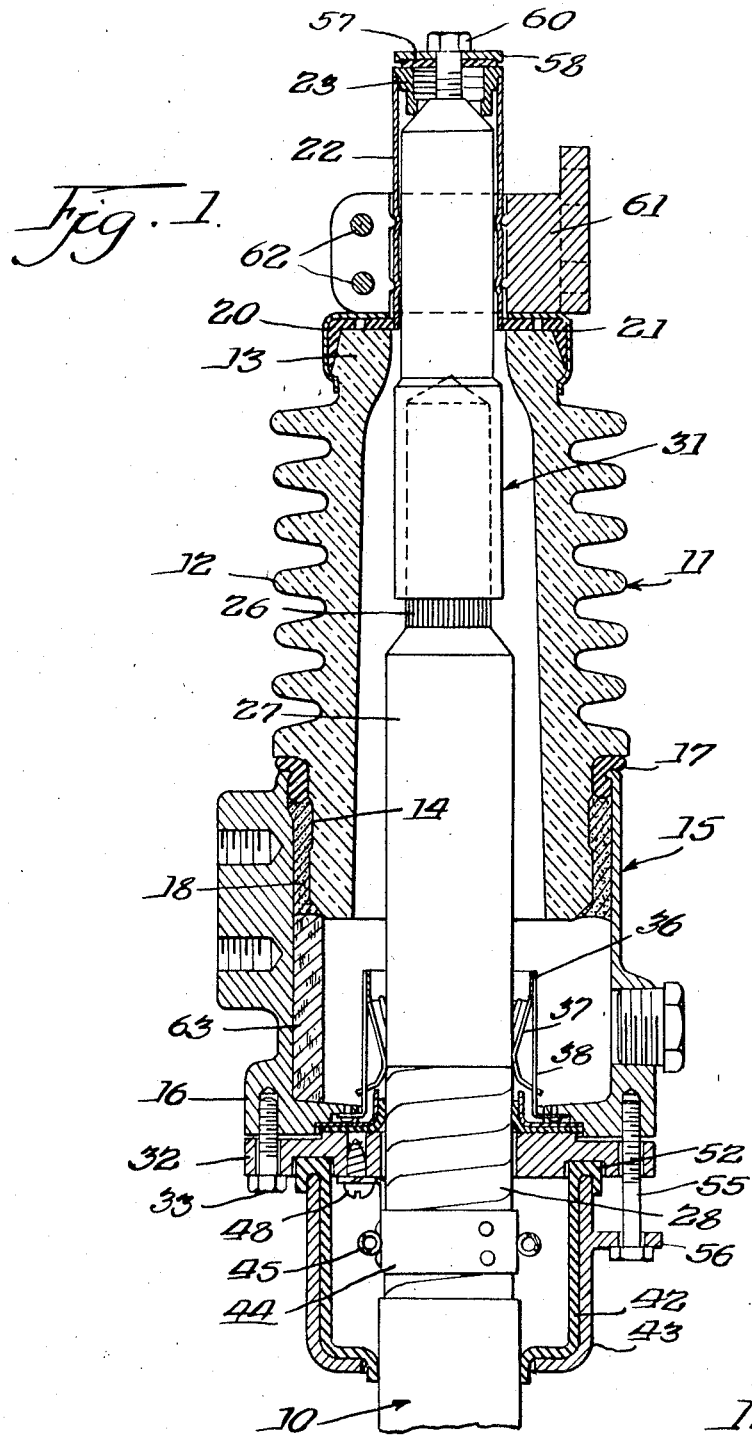
FIGURE 1 is a sectional view taken vertically through a cable termination device which embodies the improved features of the invention, the said figure showing the device completely installed on the prepared end of a power cable.

In the drawings the numeral 10 indicates a power cable of the plastic insulated type and the numeral 11 indicates an insulator which comprises one of the main elements of the terminator assembly. The insulator is formed of any suitable ceramic or plastic material having outwardly projecting skirts 12, a formed top portion 13 and a bottom shank portion 14. The base member 15 is combined with the insulator to form the terminator assembly, said base member comprising a metal casing having a reinforced bottom section 16, and a top end which is beaded inwardly for interengaging relation with the resilient gasket 17. The insulator 11 and the metal base 15 are physically united and sealed to the shank portion by the cement 18.

The formed top end 13 of the insulator receives the metal cap 20 which retains the metal hood 22 whereas the gasket 21 serves to seal this end of the device. The metal hood carries the internally threaded ring member 23 which is soldered to the hood. The terminator device as it is factory assembled is provided with the releasable plug 24, FIGURE 2, which is threaded in the ring member 23 to seal this end and retain the dielectric filling compound within the assembly.

The cable 10 provides the copper wires 26 forming the cable conductor and which is covered by the cable insulation 27, by the cable overshield 28 and by the cable jacket 30. This terminal end of the power cable is prepared as shown in the drawings to expose the current conducting wires 26 and to which in telescoping relation the connector 31 is pressed, crimped or soldered.

The terminators are of uniform internal length. The threaded ring member 23 is purposely designed to be long enough to allow for the uniform terminator drilling depth at the factory. The normal terminator length variations are due to the commercial tolerances of the insulator, the metal body and compression variations of the gaskets. With the properly secured connector at the end of the cable, the length of the exposed cable insulation to the edge of the cable overshield is the only important dimension of consideration (see X in FIGURE 3). This dimension must be observed in order that the cable, when inserted within the terminator, will properly align and make positive contact with the factory built-in girdle shield fingers 37, thus insuring good ground connection.

The entrance end of the terminator as the same is factory assembled is best shown in FIGURE 2. An entrance plate 32 is releasably secured by the bolts 33 to the reinforced bottom end 16 of the terminator device. The plate clamps an elastomeric diaphragm 34 and a plastic film seal 35 between said plate and the recessed bottom 16 of the terminator with the plastic film seal being located next to the bottom wall.

The termination of the cable shielding is effectively accomplished by a girdle shield indicated in its entirety by the numeral 36 and which will generally have the shape of a closed annular member providing the spring fingers 37. The shield is factory assembled in the terminator, being supported by the legs 38 which are secured by the rivets 39 to the base 16. The inside diameter of the opening formed by the spring fingers 37 is somewhat smaller than the cable insulation diameter so that when the cable is inserted through the opening, the fingers will have a good conductive contact path with the cable overshield. The legs serve to ground the girdle shield in addition to serving as a fixed support for the shield.

As previously stated the present terminator is not only factory assembled but also prefilled with a special filling compound. The preferred compound consists of a mixture of high molecular weight polybutenes and low molecular weight polyolefins and the same is characterized by a high tack value as regards the cable insulation, the porcelain shell of the terminator and the metal of the girdle shield. The filling compound should also retain its flexibility at low temperatures and the same should have a relatively low coefficient of thermal expansion.

The entrance sealing diaphragm 34 is a single diaphragm of the self-energizing type. The material used for the diaphragm is preferably a silicone elastomer or a highly fluorinated elastomer to afford the greatest possible protection against environmental degradation such as ozone attack, ultra-violet radiation and oxidation. The opening in the diaphragm and which aligns with the central opening in the plate 32 and reinforced bottom end 16 is punched or molded to be somewhat smaller in diameter than that of the cable portion with which the diaphragm has contact. Thus when the parts are assembled the diaphragm has a tight sealing contact with the cable insulation and the periphery of the hole in the diaphragm is in tension..

For installing the present cable termination assembly on the prepared end of a cable, the first operation is to attach the connector 31 to the bare copper conductor wires 26 and then place on the cable in telescoping relation therewith the elastomeric boot 42 and the enclosing housing or container 43. The said container additionally functions as a compression ring for the resilient boot. FIGURE 3 shows the parts on the prepared end of a power cable and it will also be observed that a grounding strap 44 together with a garter spring 45 has been applied to the cable shielding portion 28. The grounding strap 44 is shown in extended form in FIGURE 7. The material of the strap is relatively soft metal such as copper so that it can be easily formed into a circular shape around the cable diameter. The lug 46 is formed integral with the strap and the opening 47 is adapted to receive the self-tapping screw 48, FIGURES 1 and 4, which secures the grounding strap to the plate 32 as shown in FIGURE 1. The protuberances 50 are formed in the strap in spaced relation for positioning the garter spring 45 which applies a pressure to the strap to hold the same in good electrical contact with the cable shielding portion.

When the resilient boot, compression ring and grounding strap have been applied to the cable all as shown in FIGURE 3, the next step in completing the installation is to remove the nut 24 and thread in its place the container 51 for receiving the filling compound which is displaced by the cable. The terminator can now be placed on the cable end or the cable can be inserted within the terminator. In either case the plastic film seal 35 is broken and the diaphragm 34 is caused to contact the cable with the edges of the opening in the diaphragm having a tight fit with the cable insulation. The insertion of the cable is continued until the end of the connector 31 contacts the interiorly threaded ring member 23. This will locate the end of the shielding portion 28 of the cable in contact with the built-in girdle shield of the terminator. The ground strap 44 is then secured to the bottom plate 32 using the self-tapping screw 48. With the cable fully inserted into the terminator, the container 51 is removed and this top end of the terminator device is then closed and sealed by securing bolt 60, consisting of plate 58 and semi-recessed gasket 57. The bolt has threaded relation with the top end of connector 31 thus uniting these parts in assembled relation. For the outside electrical connections to the terminator device, it is desired that a lug such as 61, FIGURE 1, or similar clamp be employed. The clamp is fitted around the hood portion 22 and secured in position thereon by the securing bolts 62.

The elastomeric boot is next raised and positioned so that its specially formed upper edge 52 resides in the groove 53 provided for it in the entrance plate 32. The opening in the bottom of the boot, being smaller in diameter than the cable, forms a running seal between the cable jacket and the boot with the sealing lip 54 projecting outward. The enclosing container 43 is now raised and fitted into the edge 52 to form the compression ring for the elastomeric boot. Two or more bolts such as 55 are passed through openings in the flanges 56 for securing the boot structure to the bottom of the entrance plate 32. As a result thereof the upper edge 52 of the boot is compressed against the entrance plate to form an hermetic seal.

The resilient boot is designed to minimize pressure differentials between the grounding contact system, that is, the strap 44, the cable overshield and the garter spring 45 and the outside environment due to temperature variations. The walls of the boot semi-collapse when a reduced pressure caused by a temperature drop develops inside the boot. The reduced volume keeps the pressure differential to an acceptable level. Excessive internal pressure is relieved by the exhausting of air through the seal lip of the boot and the cable jacket. Once an over pressure is relieved the system becomes stable. Any tendency for the boot cavity to pump, that is, to inhale outside atmosphere is thus minimized.

The bottom sealing arrangement using the ground strap 44 thus provides a good current carrying connection to the cable overshield system without the need of soldering or the use of lugs or clamps. Also, a good current carrying connection is provided without applying excessive pressure to the cable insulation in addition to the capability of expanding and contracting with the cable while maintaining good contact. The bottom sealing arrangement will also protect the exposed cable overshield and the termination grounding system from the outside environment.

An additional feature of the present termination assembly resides in the provision of a sponge element 63 having a location within the metal base member 15. The element 63 is a closed cell elastomeric sponge element and its specific function is to compensate for the thermal expansion of the special filling compound and also the thermal expansion of the cable insulation due to atmospheric temperature variations and the load variations of the power cable.

What is claimed is:

1. In a termination system for a power cable, the combination with a terminator assembly having telescoping relation with the prepared end of the power cable, of sealing means for sealing the entrance end of the terminator assembly with respect to the power cable, said sealing means including an entrance plate secured to the entrance end of the terminator assembly and having a central opening through which the cable extends, an elastomeric diaphragm located between the entrance end of the terminator assembly and said plate and clamped in sealing relation thereby, said diaphragm having an opening therein through which the cable extends and with the edges of the opening in close contact with the said cable, a girdle shield located within the terminator assembly in surrounding relation with the cable, said girdle shield having contact with the cable overshield immediately above the diaphragm, a compound filling the interior of the terminator assembly, and bottom sealing structure in surrounding relation with the cable below the entrance plate, said bottom sealing structure including a resilient boot, a cup-shaped enclosing housing member which functions as a compression ring for the boot, and means securing the enclosing member to the terminator assembly.

2. A termination system for a power cable as defined by claim 1, additionally including a closed cell elastomeric sponge element having location within the terminator assembly and being immersed in the filling compound.

3. A termination system for a power cable as defined by claim 1, wherein the girdle shield consists of a closed annular member formed of metal and having a plurality of resilient fingers which contact the cable insulation.

4. A termination system for a power cable as defined by claim 1, wherein the resilient boot is formed of elastomeric material, and wherein the boot has a bottom opening through which the cable extends with the edges of the opening in close contact with the cable jacket.

5. A termination system for a power cable as defined by claim 1, wherein the girdle shield consists of a closed annular member formed of metal and having a plurality of resilient fingers which contact the cable insulation, wherein the resilient boot is formed of elastomeric material, and wherein the boot has a bottom opening through which the cable extends with the edges of the opening in close contact with the cable jacket.

6. A termination system for a power cable as defined by claim 1, additionally including a metal grounding strap grounded to the metal plate and having surrounding relation with the cable overshield, and a garter spring in surrounding contact with the grounding strap to provide good electrical contact between the strap and the cable overshield.

References Cited

UNITED STATES PATENTS

| | | | |
|---|---|---|---|
| 2,794,063 | 5/1957 | Nicholas | 174—73.1 X |
| 3,243,499 | 3/1966 | Lusk | 174—73 |
| 3,322,883 | 5/1967 | Lusk | 174—73 |
| 3,336,435 | 8/1967 | Lusk | 173—73 |
| 3,359,362 | 12/1967 | Lusk et al. | 174—19 X |

LARAMIE E. ASKIN, *Primary Examiner.*

U.S. Cl. X.R.

174—19, 73, 78